2,849,448
STEROID COMPOUNDS

George B. Spero and John L. Thompson, Kalamazoo, Mich., assignors to The Upjohn Company, Kalamazoo, Mich., a corporation of Michigan No Drawing. Application August 9, 1957
Serial No. 677,206

4 Claims. (Cl. 260—239.55)

This invention relates to 6,11-dialkyl-11-hydroxyprogesterone, a new class of chemical compounds, and to methods for their preparation. It relates more particularly to 6,11-dimethyl-11-hydroxyprogesterone; to novel intermediates, 5α,11-dihydroxy - 6β,11 - dimethylallopregnane-3,20-dione, 3,20-bis(alkylene ketal), and 5α,11-dihydroxy-6β,11-dimethylallopregnane-3,20-dione; and to methods for the preparation of these compounds.

The new class of compounds, 6,11-dialkyl-11-hydroxyprogesterone, particularly the 6,11-dimethyl member and more particularly the 6α,11-dimethyl epimer, possesses pharmacological activity valuable in the treatment of animal organism, displaying significant hypotensive activity; and can be administered in the form of a pharmacological composition or mixture, e. g., a stable suspension or a suspension readily resuspendible to be injected for the treatment of hypertension in the animal organism. The compounds can also be administered orally in the form of syrups or tablets or other conventional dosage form.

The novel compounds of this invention can be prepared from the known compound, 11-ketoprogesterone (I), by the methods and steps schematically represented as follows:

It is to be understood that the invention contemplates both the 6α-methyl and 6β-methyl configurations as well as other α- or β-lower-alkyl substituents, i. e., those containing up to and including eight carbon atoms, the compounds having corresponding alkyl substituents at position 11.

The ketal-forming step whereby compound II, above is produced can be carried out as disclosed in U. S. Patent 2,773,060 using the ketal-forming agents disclosed therein, i. e., alkane-1,2-diol or alkane-1,3-diol such as, for example, ethylene glycol, propane-1,2-diol, propane-1,3-diol, butane-1,2-diol, pentane-1,2-diol, 3-methylpentane-1,2-diol, hexane-1,3-diol, octane-1,2-diol and the like. The 3,20-ketal groups resulting are thus each of the following general formula:

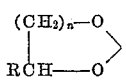

wherein R is a member of the group consisting of hydrogen and a lower-alkyl group, and $n$ is an integer from one to two, inclusive.

The epoxidation step whereby compound III is prepared is accomplished by means of an epoxidizing agent, for example, an organic carboxylic peracid, e. g., peracetic or perbenzoic acid, producing the corresponding 5,6-oxide. A mixture of both the α- and β-oxides is produced in this reaction step in some instances, and in that event the α-oxide can be separated by chromatographic or crystallization techniques well known in the art.

The alkylation step can be carried out by means of an alkyl metal compound, preferably a methyl metal

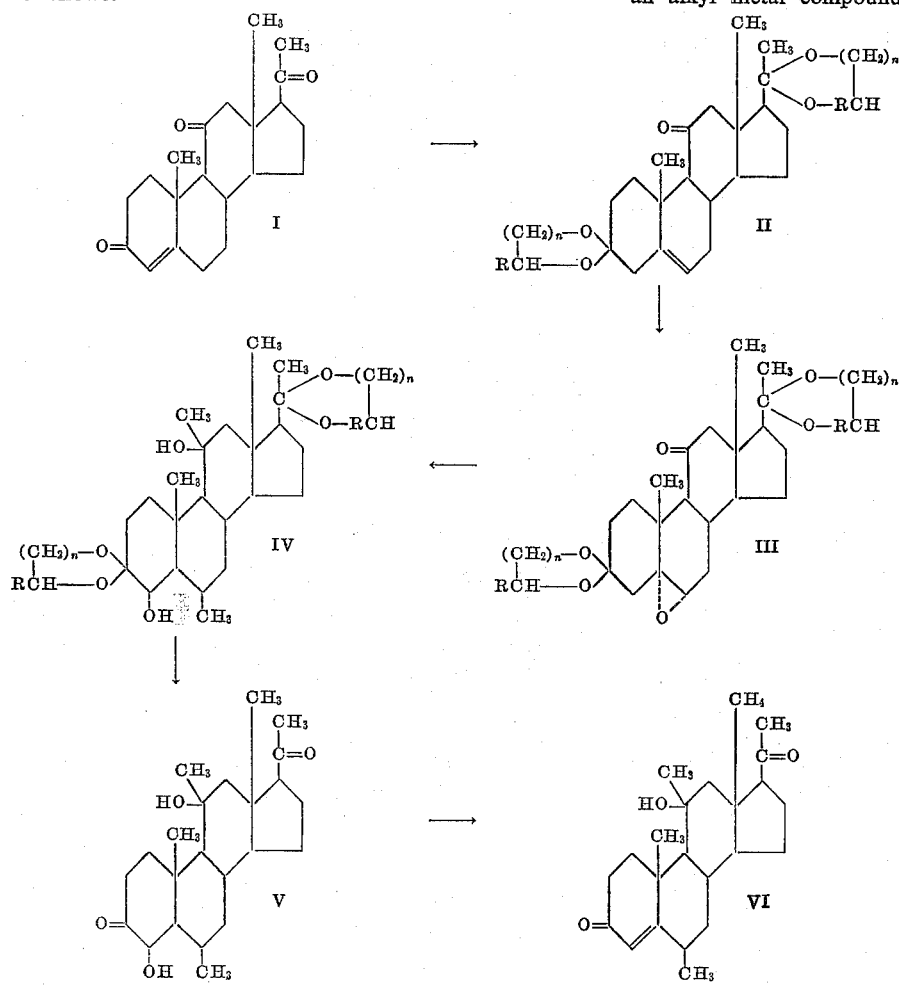

halide and specifically a methyl Grignard reagent, to give the corresponding 6,11-dialkylated compound represented by the dimethyl compound of Formula IV. The 6β-configuration results, as is shown in Formula IV.

The hydrolysis of the 3,20-diketal of Formula IV can be carried out under conventional hydrolytic conditions, for example, using aqueous acid under very mild conditions. Room temperature and the use of weak or dilute acids yield satisfactory results.

The dehydration of compound V, above, can be carried out with an aqueous solution of a base or an acid to obtain the product of compound VI, 6,11-dialkyl-11-hydroxyprogesterone. Large amounts of acid or base produce the 6α-epimer, 6α,11-dialkyl-11-hydroxyprogesterone; whereas smaller amounts of acid or base wherein the reaction mixture is near neutral results in the 6β-epimer, 6β,11-dimethyl - 11 - hydroxyprogesterone. The latter compound can be converted with acid or base by an additional step to the α-epimer. If a mixture of α- and β-6-alkyl epimers result from the dehydration step, separation can be effected by chromatography or crystallization.

The alkylation step can be carried out using other metal halides, dialkyl cadmium compounds, alkyl cadmium halides, alkyl calcium halides, especially alkyl Grignards such as ethyl, propyl, butyl, magnesium bromide or iodide or lower-alkyl metal alkylating agents such as methyl lithium to produce 6,11-dialkyl-11-hydroxyprogesterone in which the alkyl group is ethyl, propyl, butyl or the like.

The following preparation and examples are illustrative of the process and products of the present invention but are not to be construed as limiting.

PREPARATION 1

*11-ketoprogesterone, 3,20 bis(ethylene ketal) (II)*

A mixture of 200 grams (0.66 mole) of 11-ketoprogesterone (I), 9.94 grams (52 millimoles) p-toluenesulfonic acid monohydrate, 400 milliliters (358 grams) (5.77 moles) of ethylene glycol, and four liters of benzene was vigorously stirred and allowed to reflux for a period of five hours. The water formed in the reaction was removed by means of a water trap. The reaction mixture was then cooled, washed with five percent sodium bicarbonate solution and water, dried and evaporated to dryness under reduced pressure. The residue was crystallized from ethyl acetate and gave, in two crops, 138.1 grams of 11-ketoprogesterone, 3,20-bis(ethylene ketal) having a melting point of 172 to 182 degrees centigrade.

In addition to the synthesis described above, other 11-ketoprogesterone, 3,20-bis(lower-alkylene) ketals can be formed by reacting 11-ketoprogesterone with alkane-1,2-diols, or alkane-1,3-diols such as, for example, ethylene glycol, propane-1,2-diol, propane-1,3-diol, butane-1,2-diol, pentane-1,2-diol, 3-methylpentane-1,2-diol, hexane-1,3-diol, octane-1,2-diol and the like.

EXAMPLE 1

*5α,6α-oxido-11-ketoallopregnane-3,20-dione, 3,20-bis(ethylene ketal) (III)*

832 milligrams (2.5 millimoles) of II dissolved in twenty milliliters of chloroform was added to a suspension of one gram of anhydrous sodium acetate in twenty milliliters of forthy percent peracetic acid. The heterogeneous mixture was stirred vigorously for a period of two hours. Then the chloroform phase was separated, washed with five percent sodium bicarbonate, next with water and then evaporated to dryness. The residue, following two recrystallizations from chloroform, yielded 316 milligrams of 5α-6α-oxido-11-ketoallopregnane-3,20-dione, 3,20-bis(ethylene ketal) having a melting point of 210 to 214 degrees centigrade. A second crystalline fraction that melted at 183 to 185 degrees centigrade was isolated from the mother liquors. This was the 5β,6β-oxide.

The analytical sample of III melted at 214 to 218 degrees centigrade, $[\alpha]_D$ equals minus seven degrees (chloroform).

*Analysis.*—Calculated for $C_{25}H_{36}O_6$: C, 69.42; H, 8.39. Found: C, 69.73; H, 8.85.

EXAMPLE 2

*5α,11β-dihydroxy-6β,11α-dimethylallopregnane-3,20-dione, 3,20-bis(ethylene ketal) (IV)*

A solution of 865 milligrams of III in forty milliliters of tetrahydrofuran was added dropwise to five milliliters of a four molar ether solution of methyl magnesium bromide. The addition was at a rate slow enough to prevent the refluxing from becoming too violent. Stirring and refluxing was continued for seventeen hours. The reaction mixture was then cooled and 25 milliliters of iced saturated ammonium chloride solution was added. The mixture was stirred for a few minutes and then extracted with ether. The ether extract was washed with water, dried and allowed to evaporate to dryness. The residue, 934 milligrams of oil, was 5α,11β-dihydroxy-6β,11α-dimethylallopregnane-3,20-dione, 3,20-bis(ethylene ketal) and can be hydrolyzed as illustrated in the next step without further purification.

In addition to the synthesis described above, 5α,11β-dihydroxy-6β,11α-dialkylallopregnane-3,20-dione, 3,20-bis(lower-alkylene) ketals can be formed by reacting 5α,6α-oxido-11-ketoallopregnane-3,20-dione, 3,20-bis(lower-alkylene) ketals with ethyl, propyl or butyl magnesium bromides and iodides or similar alkyl cadmium and calcium bromides or iodides.

EXAMPLE 3

*5α,11β-dihydroxy-6α,11β-dimethylallopregnane-3,20-dione (V)*

A solution of 934 milligrams of IV in ten milliliters of acetone and one milliliter of 1 Normal sulfuric acid was gently boiled on the steam bath for three minutes. Following this, crystallization began. The mixture was cooled and refrigerated to yield 552 milligrams of 5α,11β - dihydroxy - 6β,11α - dimethylallopregnane - 3,20 - dione crystals with a melting point of 258 to 268 degrees centigrade. The analytical sample, recrystallized from acetone, melted at 272 to 274 degrees centigrade, $[\alpha]_D$ equals plug 57 degrees (dioxane).

*Analysis.*—Calculated for $C_{23}H_{36}O_4$: C, 73.36; H, 9.64. Found: C, 73.58; H, 9.86.

In addition to the synthesis described above in Example 3, 5α,11β-dihydroxy-6β,11α-dialkylallopregnane-3,20-dione can be formed by hydrolyzing 5α,11β-dihydroxy-6β,11α-dialkylallopregnane-3,20-dione, 3,20-bis(lower-alkylene) ketals with 1 Normal sulfuric acid.

EXAMPLE 4

*6α,11α-dimethyl-11β-hydroxyprogesterone (VI)*

A suspension of one gram of V in 300 milliliters of ethanol (containing about five percent methanol as a denaturant) and ten milliliters of 0.1 Normal sodium hydroxide solution was stirred for a period of seventeen hours at room temperature. The resulting solution was neutralized with acetic acid and diluted with 100 milliliters of water. It was then concentrated under reduced pressure to about fifty milliliters whereupon crystallization took place. After cooling, the product was filtered, and 848 milligrams of 6α,11α-dimethyl-11β-hydroxy progesterone with a melting point of 198 to 205 degrees centigrade was recovered. The analytical sample was recrystallized from acetone and melted at 215 to 217 degrees centigrade, $[\alpha]_D$ equals plus 152 degrees (chloroform).

In addition to the synthesis described above, other 6α,11α-dialkyl-11β-hydroxyprogesterones can be formed by the dehydration of 5α,11β-dihydroxy-6β,11α-dialkylallopregnane-3,20-dione with 0.1 Normal sodium hydroxide, thus to produce 6α,11α-diethyl-11β-hydroxyprogesterone, 6α,11α-dipropyl-11β-hydroxyprogesterone, and 6α,11α-dibutyl-11β-hydroxyprogesterone.

It is to be understood that the invention is not to be limited to the exact details of operation or exact compounds shown and described, as obvious modifications and equivalents will be apparent to one skilled in the art, and the invention is therefore to be limited only by the scope of the appended claims.

We claim:

1. A member of the group consisting of 5α,11-dihydroxy-6β,11-dimethylallopregnane-3,20-dione, 3,20-bis-(lower-alkylene) ketal; 5α,11-dihydroxy-6β,11-dimethylallopregnane-3,20-dione; and 6α,11-dimethyl-11-hydroxyprogesterone.

2. 5α,11β - dihydroxy - 6β,11α - dimethylallopregnane - 3,20-dione, 3,20-bis(lower-alkylene) ketal.

3. 5α,11β - dihydroxy - 6β,11α - dimethylallopregnane - 3,20-dione.

4. 6α,11α-dimethyl-11β-hydroxyprogesterone.

References Cited in the file of this patent

UNITED STATES PATENTS 2,752,369     Holysz _____ June 26, 1956

UNITED STATES PATENT OFFICE
Certificate of Correction

Patent No. 2,849,448                          August 26, 1958

George B. Spero et al.

It is hereby certified that error appears in the printed specification of the above numbered patent requiring correction and that the said Letters Patent should read as corrected below.

Column 2, Formula VI should appear as shown below instead of as in the patent:

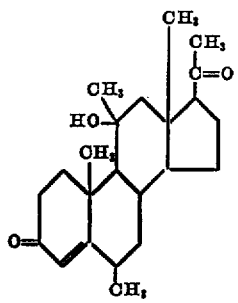

column 4, line 36, for "-6α,11β-" read — -6β,11α- —; line 48, for "plug" read —plus—.

Signed and sealed this 12th day of May 1959.

[SEAL]

Attest:
KARL H. AXLINE,
*Attesting Officer.*

ROBERT C. WATSON,
*Commissioner of Patents.*